United States Patent [19]

Mizzi

[11] 4,272,947
[45] Jun. 16, 1981

[54] TOPPING CUTTER FOR A CANE HARVESTER

[76] Inventor: Joseph M. Mizzi, Halifax Rd., Ingham, Queensland, Australia, 4850

[21] Appl. No.: 82,334

[22] Filed: Oct. 5, 1979

[51] Int. Cl.³ .......................................... A01D 45/10
[52] U.S. Cl. ...................................... 56/63; 56/121.4
[58] Field of Search ...................... 56/295, 56, 57, 58, 56/63, 121.4

[56] References Cited

U.S. PATENT DOCUMENTS

| | | | |
|---|---|---|---|
| 2,475,716 | 7/1949 | Nabors | 56/295 |
| 3,596,447 | 8/1971 | Makeham et al. | 56/63 |
| 3,760,569 | 9/1973 | Willett | 56/63 |
| 3,848,399 | 11/1974 | Makeham | 56/295 |
| 4,008,557 | 2/1977 | Ruback et al. | 56/63 |

FOREIGN PATENT DOCUMENTS 409961 10/1966 Australia ................................. 56/63
404197 6/1968 Australia ................................. 56/63

*Primary Examiner*—Paul J. Hirsch
*Attorney, Agent, or Firm*—Schwartz, Jeffery, Schwaab, Mack, Blumenthal & Koch

[57] ABSTRACT

A topping cutter for a cane harvester, supported and vertically adjustable in front of the harvester for severing tops of cane to be harvested, has a frame with two adjacent counter-rotatable feed drums with radiating fingers to engage the cane tops and feed them rearwardly, and a pair of cutters, one behind each feed drum, for coacting with the feed drum to sever the cane tops. A deflector on the frame is movable to direct the gathered cane tops selectively to either set of feed drum and coacting cutter, and the two sets of feed drum and cutter are arranged, together with guides on the frame, to eject the severed tops to opposite sides of the frame.

4 Claims, 4 Drawing Figures

TOPPING CUTTER FOR A CANE HARVESTER

BACKGROUND OF THE INVENTION

This Invention relates to a topping cutter for a cane harvester.

A cane harvester is normally provided with a topping cutter for the purpose of severing the leafy tops of cane stalks as the harvester advances, and before the stalks are cut at or near to ground level by base cutters and then chopped into billets which are elevated and discharged from the harvester. Such a topping cutter is usually of rotary type, and is capable of being adjustably raised and lowered as the harvester advances to suit the height of the cane being harvested. As the harvester will generally be driven in opposite directions for harvesting successive rows of cane, turning in the headlands, in order to reduce the travelling which would otherwise be necessary, it is desirable that the topping cutter should be capable of ejecting the severed tops to either one side or the other so that, whichever way the harvester is travelling, the tops will be thrown onto the area already harvested and not onto the standing cane.

The present invention has been devised with the general object of providing a cane harvester topping cutter which is particularly efficient and positive in action.

BRIEF SUMMARY OF THE INVENTION

The invention resides broadly in a topping cutter for a cane harvester which has a frame supported in front of a cane harvester so it can be raised or lowered to suit the cane being harvested. A pair of adjacent counter-rotatable feed drums with radiating fingers are mounted at the front of the frame, and are adapted to engage and feed between them the tops of cane stalks as the harvester advances. Behind each feed drum and partly overlapped by it is a rotary cutter adapted to coact with the drum to sever the tops of cane stalks, the two sets of feed drum and coacting cutter, in conjunction with guides on the frame, being adapted to eject severed tops of cane stalks to opposite sides of the frame. A deflector device is provided on the frame, and is movable to direct cane tops selectively to either set of coacting feed drum and cutter. Other features of the invention will become apparent from the following description.

BRIEF DESCRIPTION OF THE DRAWINGS

A preferred embodiment of the invention is shown in the accompanying drawings, wherein.

DETAILED DESCRIPTION OF THE PREFERRED EMBODIMENT

Figure 1:
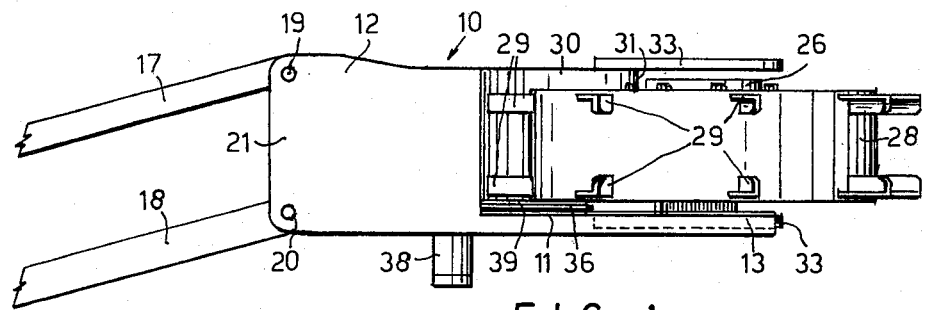
FIG. 1 is a side elevational view of a topping cutter according to the invention.

The topping cutter includes a frame 10 having a base plate 11 the rear part of which is secured between a pair of parallel side plates 12, in front of which the base plate is shaped to form two spaced forward projections 13 to opposite sides of a shorter central forward projection 14. Between the top parts of the side plates 12 there is secured a top plate 15, parallel to the base plate 11, and with a central forward projection 16 similar to and directly above the central projection 14 of the base plate.

The topping cutter frame is carried by a pair of upper parallel-motion links 17 and a pair of lower parallel-motion links 18, both pairs being pivoted about transverse axes to a sugar cane harvester (not shown) and pivoted at their front ends, at 19 and 20, between pairs of parallel lugs 21 extending from the rear of the frame 10. Any suitable hydraulic or other means (not shown) are provided for raising and lowering the parallel-motion links which are such that the topping cutter is raised and lowered in parallelism, its base plate 11 remaining substantially horizontal.

On each of the forward projections 13 of the base plate 11 there is mounted a support bracket 22 for a reversible hydraulic motor 23 and for a radial and thrust bearing at 24 for the substantially vertical shaft 25 of the motor. Secured on this shaft is a coaxial shallow cylindrical drum carrier 26 with a peripheral flange 27. An open-bottomed feed drum 28 with a centrally apertured top is fitted down on the drum carrier 26 and bolted to its flange 27.

Figure 2:
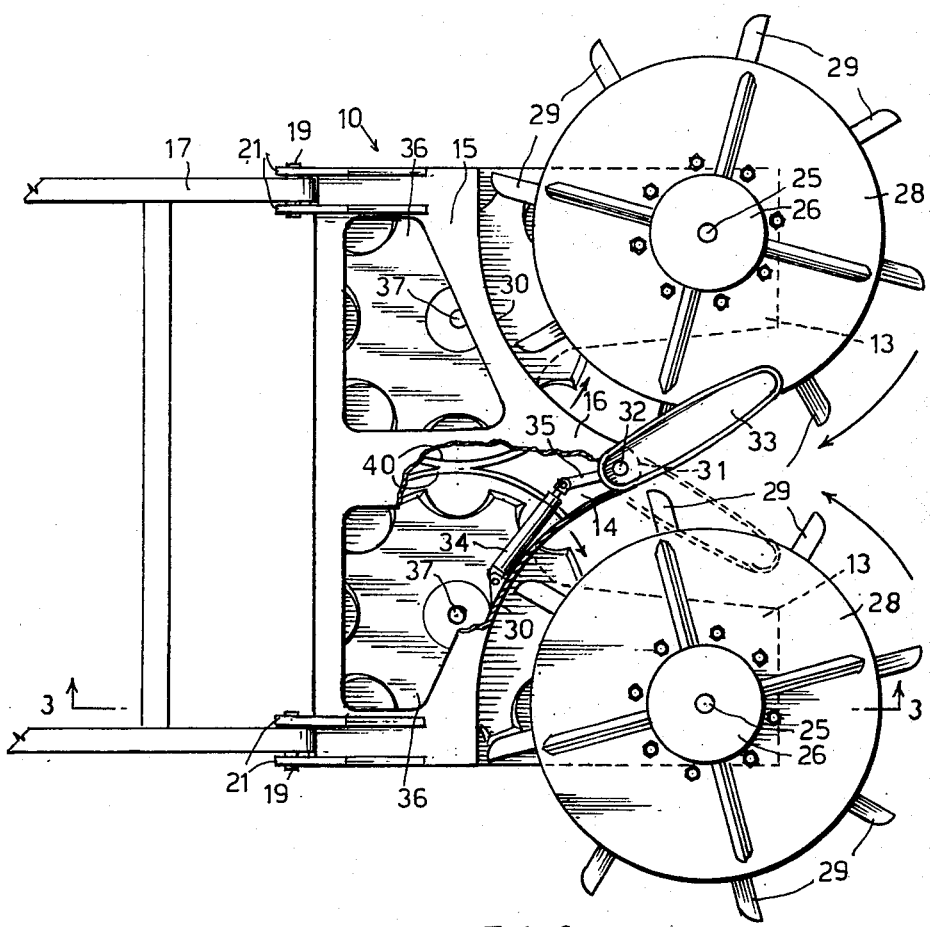
FIG. 2 is a partly broken-away plan view of the device.
Figure 3:
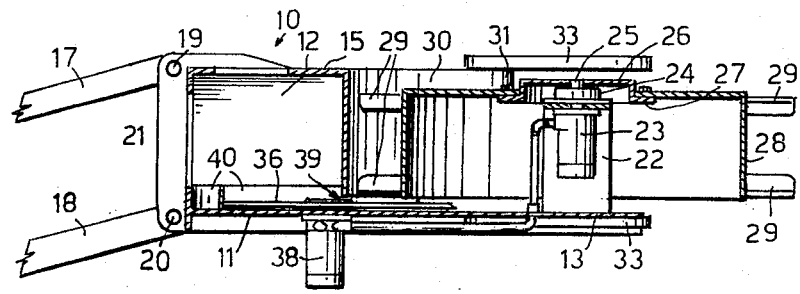
FIG. 3 is a sectional view along line 3—3 in FIG. 2.
Figure 4:
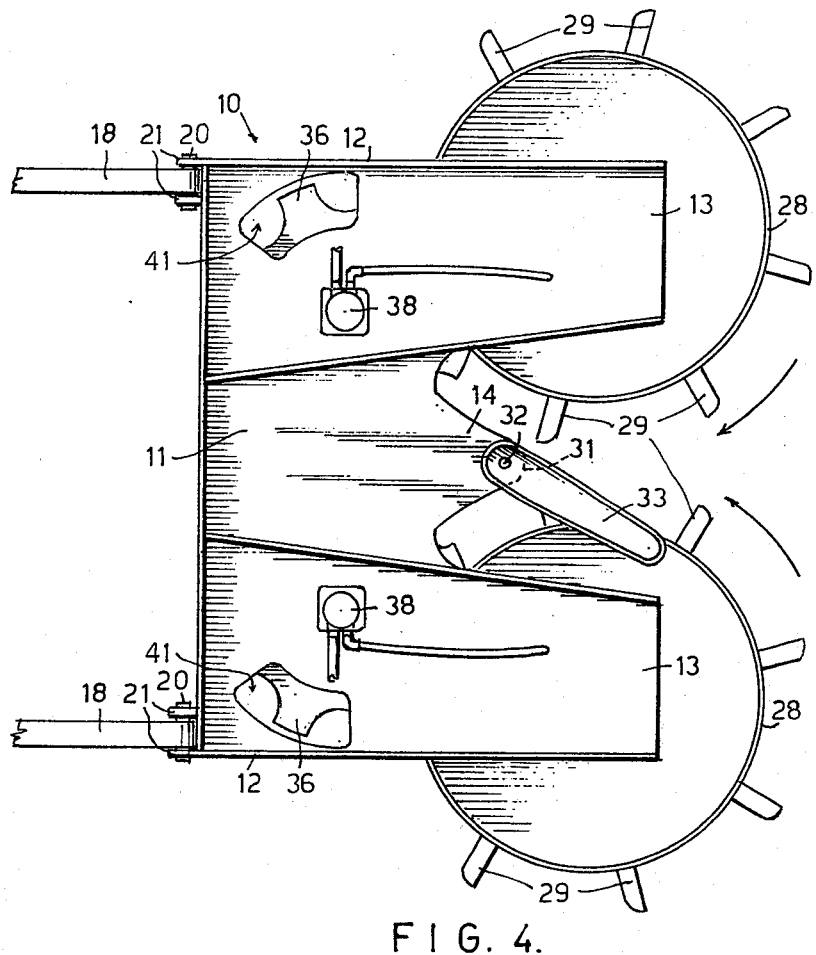
FIG. 4 is a view of the underside of the topping cutter.

Each of the feed drums 28 has a number of equally spaced pairs of fingers 29 extending radially therefrom, one of each pair being near the top, the other near the bottom of the drum. The motors 23, when operated, drive the two feed drums in opposite directions, as indicated by arrows in FIGS. 2 and 4 so that, as the harvester advances, the fingers 29 of the two drums will engage cane tops and bring them together in front of the topping cutter and convey them rearwardly between the feed drums. The fingers 29, when moving rearwardly and outwardly closely approach a pair of upright arcuately curved guide plates 30 secured between the top plate 15 and base plate 11 and the edges of the central projections 16 and 14 of these plates, the two guide plates meeting at a fairly sharp junction which constitutes a divider 31. A vertical deflector shaft 32 is mounted oscillatably behind this divider, passing through bearings in the front parts of the projections 15 and 14, and having secured to its upper and lower ends a pair of parallel deflector arms 33, extending generally forwards, one above, the other below, the feed drums 28. A small double-acting hydraulic cylinder 34, pivoted behind one of the guide plates 30, has its piston connected to a lever 35 secured to and extending radially from the deflector shaft 32, and may be operated to swing the two deflectors to either of two positions as indicated in FIG. 2, in full outline and in broken outline.

Above the rear part of the base plate 11 there are mounted a pair of similar rotary cutters 36, each having a scalloped cutting edge, and being secured on the upper end of the shaft 37 of a hydraulic motor 38 mounted below the base plate 11. The cutters are of lesser diameter than the feed drums 28, and they are fairly closely adjacent, the front part of each passing through a slotted opening 39 in the lower part of a guide plate 30 and extending under the rear part of the feed drum 28 in front of it. At each side of the apparatus, the cutter motor 38 and the feed drum motor 23 are connected hydraulically in series and driven in opposite directions.

In use, the cane tops gathered by the fingers 29 of the counter-rotated feed drums 28 and carried rearwardly between these drums are deflected, by the upper and lower deflector arms 33, to be carried between one of the drums and one of the guide plates 30 and to be severed by the appropriate one of the two rotary cutters 36, the cane tops so severed being ejected to one side of the topping cutter between the rear of the feed drum and the outer part of the guide plate. When it is required that the cane tops should be ejected to the opposite side, it is necessary only to actuate the hydraulic cylinder 34 to swing the deflector arms 33 to their alternative positions.

The open-bottomed construction of the feed drums 28 ensures that there will be no undue build-up of trash or leafy material between the drums and the base plate projections 14 above which they are mounted. Behind the guide plates 30 the rotary cutters 36 are located within arcuate flanges 40 on the base plate 11, and leafy material carried by the cutters will be discharged through openings 41 in the base plate.

If it should at any time be necessary to clear trash from the moving parts of the apparatus, this may be greatly facilitated by briefly reversing the motors 38 and 23.

I claim:

1. A topping cutter for a cane harvester including:

a frame, means for mounting the frame in a vertically adjustable manner on a cane harvester, a pair of adjacent counter-rotatable feed means mounted at the front of the frame, adapted to engage and feed between them the tops of cane stalks as the harvester advances, a rotary cutter positioned below and substantially behind each feed means and adapted to coact therewith to sever the tops of cane stalks, the two sets of feed means and coacting cutter being adapted to eject several tops of cane stalks to opposite sides of the frame, deflector means pivotally mounted on the frame, and means for moving said deflector so as to direct cane tops selectively to either set of coacting feed means and cutter, and hydraulic motors for separately driving said cutters and said feed means in opposite directions, said motors being connected in series so as to permit reversal of the directions of rotation thereof to clear trash from the area above the cutters and below said feed means.

2. A topping cutter according to claim 1 wherein each of said feed means comprises a drum with projecting fingers, and wherein said cutter is adapted to support the severed tops of cane stalks as they are conveyed, by the drum fingers, between the drum and a guide on the frame, to an outlet at a side of the frame.

3. A topping cutter according to claim 2 wherein each of said drums is entirely open at the bottom thereof so as to prevent build-up of trash or leafy material between the drums and the portions of the frame above which they are mounted.

4. A topping cutter according to claim 2 wherein said frame includes a pair of upright arcuately curved guide plates closely adjacent which the fingers of said drum pass during rotation, said cutters passing through slots formed in said guide plates, and a base plate carried at the bottom of said frame and positioned below said cutters, said base plate being formed with discharge openings whereby leafy material carried by said cutters can be discharged.

* * * * *